US006183797B1

United States Patent
Dull

(10) Patent No.: US 6,183,797 B1
(45) Date of Patent: Feb. 6, 2001

(54) METHOD FOR PRODUCING REDUCED WATER ACTIVITY LEGUMES

(76) Inventor: Bob J. Dull, 722 Victoria La., O'Fallon, IL (US) 62269

(*) Notice: Under 35 U.S.C. 154(b), the term of this patent shall be extended for 0 days.

(21) Appl. No.: 09/104,415

(22) Filed: Jun. 25, 1998

Related U.S. Application Data

(60) Provisional application No. 60/050,865, filed on Jun. 26, 1997.

(51) Int. Cl.[7] ........................................... A23L 1/00
(52) U.S. Cl. ................................. 426/507; 426/634
(58) Field of Search ..................... 426/629, 634, 426/93, 331, 507

(56) References Cited

U.S. PATENT DOCUMENTS

| | | | |
|---|---|---|---|
| 3,318,708 | * 5/1967 | Rockland | 426/634 |
| 3,337,349 | * 8/1967 | Savage | 426/636 |
| 3,869,556 | 3/1975 | Rockland et al. | |
| 4,510,164 | 4/1985 | Staley et al. | |
| 4,729,901 | 3/1988 | Rockland et al. | |
| 5,213,831 | 5/1993 | Leggott et al. | |
| 5,296,253 | 3/1994 | Lusas et al. | |
| 5,545,425 | 8/1996 | Wu | |

* cited by examiner

*Primary Examiner*—Gabrielle Brouillette
*Assistant Examiner*—Hao Mai
(74) *Attorney, Agent, or Firm*—Polsinelli Shalton & Welte, P.C.

(57) ABSTRACT

The present invention relates to a method for producing a reduced water activity legume, with the legume produced according to the present method having a hydration level ranging between about 20% and about 65% total moisture, a water activity ranging between about 0.50 and about 1.0, and an amount of humectant equal to between about 0.1% and about 15% by weight of the legume. The method includes selecting an amount of hydrated legumes and mixing a humectant solution with the hydrated legumes.

9 Claims, 1 Drawing Sheet

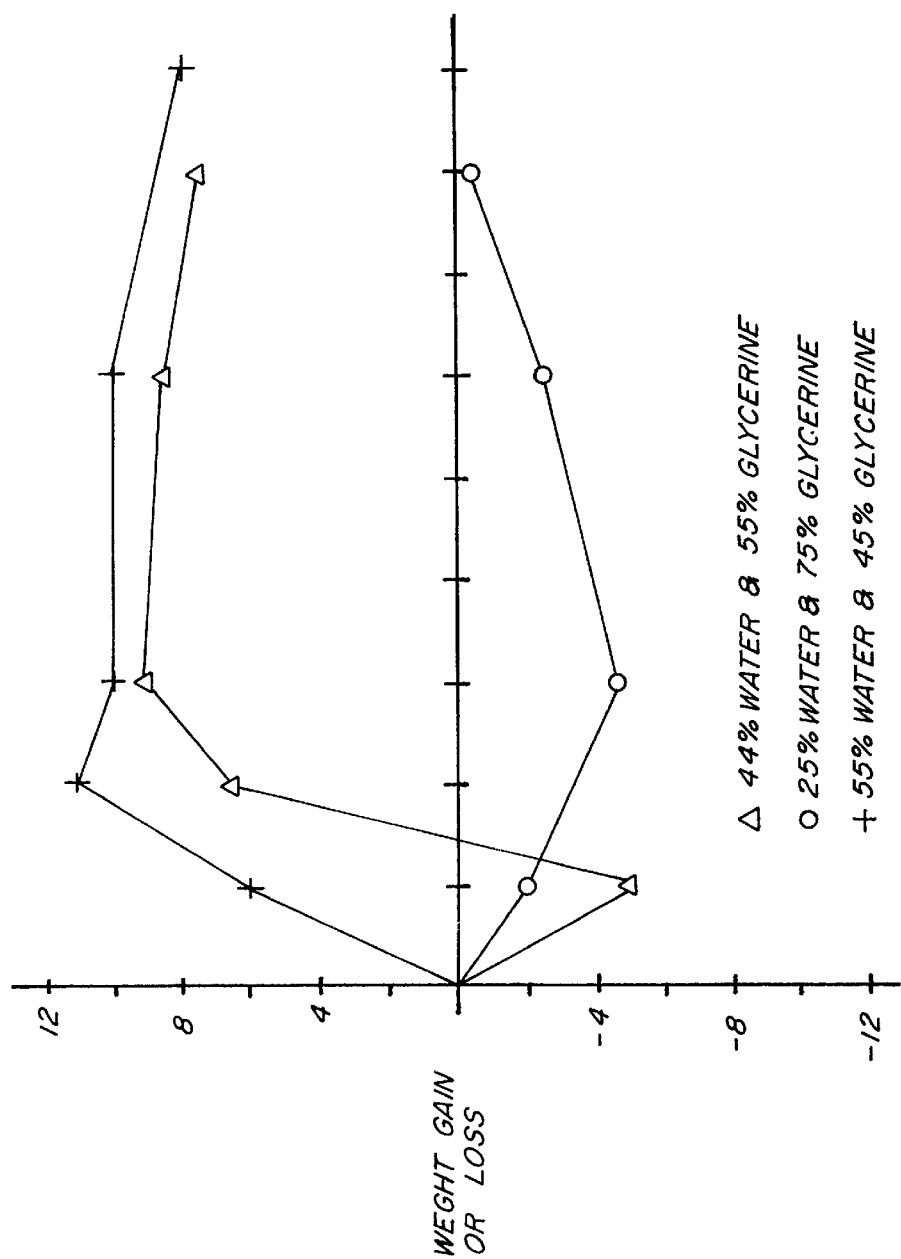

METHOD FOR PRODUCING REDUCED WATER ACTIVITY LEGUMES

This application claims the benefit of U.S. Provisional Application No. 60/050,865 filed Jun. 26, 1997.

FIELD OF INVENTION

The present invention relates to a method for producing reduced water activity legumes and, most preferably, to a method for producing both intermediate moisture and fully hydrated beans having a low water activity. Specifically, the present method involves exposing hydrated beans to a humectant solution.

BACKGROUND

Beans have been a basic food staple of humans for centuries. Traditionally, beans have been dehydrated so as to allow for storage for long periods of time. It has been necessary to dehydrate the beans because fresh hydrated beans suffer from such problems as spoilage and sprouting. In fact, fresh hydrated beans generally have a shelf life of less than a week and, more typically, approximately 3 days. The dehydration process has typically removed most of the water in the bean, with the amount of water generally being reduced from about 50% total moisture in the bean down to about 5% total moisture in the bean. The reduction in water down to 5% total moisture in the bean prevents spoilage in the bean by not leaving a sufficient amount of water available for microbial growth, which includes fungal and bacterial growth. Additionally, beans cannot sprout if there is not sufficient moisture available. Sprouting is undesirable in commercially available beans because consumers will typically refuse to purchase beans that have sprouted in the packaging. Also, sprouts change the flavor of the bean by releasing enzymes which mobilize or change starch to sugar and proteins to amino acids.

While dehydrated beans have desirable storage characteristics, such as eliminating microbial growth and sprouting, they suffer from the inability to be quickly hydrated and made suitable for human consumption within a short period of time. The necessary time required to prepare dehydrated beans for human consumption is a minimum of eight hours for the home cook and two hours for most commercial production operations. Typically, most commercial production operations retort the beans, which involves using pressure to cook the beans. Retorting results in a quicker preparation time; however, retorting or canning the beans imparts disadvantages that will be discussed below. Thus, it is desirable to have a bean that can be stored for long periods of time without spoiling and sprouting, but which can be hydrated and suitable for human consumption within a short amount of time. It would be most preferred to have a bean that is table ready within 10 minutes.

Attempts have been made at producing an intermediate moisture bean that can be prepared for human consumption in a short period of time and can be stored for long periods of time. One prior art method, Staley U.S. Pat. No. 4,510,164 discloses combining beans, water, polyglycol, and propylene glycol in a mixing unit and allowing the glycol and water to diffluse into the beans being treated. This process results in a treated bean that can be stored for a period of time and which can be made ready to eat or table ready in a short amount of time. However, the process suffers from a number of limitations. The resulting bean typically is wrinkled so that it does not have a pleasing visual appearance, which is a problem for beans that are placed in clear packaging. Additionally, the bean is discolored which also detracts from the visual appearance of the bean. Wrinkling and discoloration are problems because an important part of marketing food products is the visual appearance. If a product has a displeasing, non-natural look it is less likely to be purchased by consumers.

When glycols, water, and beans are combined in the same treatment step osmotic competition results. The osmotic competition causes a longer hydration time because glycol will bind water molecules outside the bean which in turn prevents the bean from hydrating as readily. Also, the glycol is bound to the water molecules thereby preventing the glycol molecules from readily passing into the bean. Essentially, the glycol molecules are attracted to water and, as such, will not be attracted to the moisture in the bean. Consequently, the glycol holds the water back from the beans being treated, which then requires a user to increase the temperature and to implement the use of pressure to increase the diffusion of the glycol and water into the beans. Glycol also raises the boiling point of the water so that much higher temperatures must be used to diffuse the glycol into the beans. However, as the temperature is increased, a Maillard browning reaction occurs, as well as caramelization.

A more important problem with the process of combining the beans, water, and glycol in the same step is that the treated beans will have a reduced flavor quality due to inappropriate flavor and caramelization. Caramelization is a reaction between the sugars in the beans that occurs at temperatures greater than 100° C. and causes the sugars to react and form a caramel like or thickened sugar substance. The beans are caramelized as a result of having to mix the bean, water, polyglycol, and propylene glycol mixture at high temperatures of about 100° C. to about 140° C. so that the water and glycols will diffuse into the bean cell structure. If temperatures of greater than 100° C. are not used the glycols and water will not diffuse into the beans. Caramelization is especially undesirable because it alters the flavor, color, and aroma of the treated bean, and causes skin fracturing in the bean. Skin fracturing is undesirable because it causes the skin of the bean to peel and this detracts from the visual appearance of the bean. Additionally, caramelized beans will have a darker color, will smell burnt, and will have a flavor that makes the beans taste as if they have been cooked.

Combining the beans, glycols, and water in the same step also results in Maillard browning which is a process wherein the proteins and simple sugars found in the bean react with one another. When the proteins and simple sugars react with one another they produce a compound that is neither a simple sugar, carbohydrate, or a protein and which reduces the nutritional value of the bean. The Maillard browning reaction reduces the availability of protein in the treated bean so that when a human consumes the bean they receive less available protein than what they would receive from a bean not treated with this process. Maillard browning also creates a hard outer shell on the bean, as the Maillard browning reaction causes cross linking in the outer shell of the bean. Once the shell is cross linked, the shell becomes less penetrable to water molecules and this makes it more difficult for the bean to become rehydrated.

An additional problem resulting from treating a bean in a water and glycol mixture is that the treated bean will have rehydration problems. The treated beans will not hydrate as readily because the process, which uses high temperatures to induce the glycol to diffuse into the bean, will partially cook the beans, which will in turn cook the starches and proteins found in the beans. The cooked starches and proteins will have an altered structure which will prevent some water absorption. Thus, it is further desired to have a process that results in a treated bean that is easily rehydrated, has a full complement of protein, has a pleasing visual appearance, and that does not have an altered flavor. Also, it is desirable to have a treated bean that is not caramelized, nor that has been subject to a Maillard browning reaction. In other words, a bean is desired that has characteristics similar to a fresh untreated bean, such as a smooth skin, natural color, and natural taste as well as breakage characteristics similar to a fresh bean.

Other processes used for producing consumable beans have included canning beans, but canned or retorted beans suffer from the disadvantages of lacking flavor and freshness, because retorting the beans involves cooking the beans. Typically, the retorting will cause the beans to overcook, which results in beans that are mushy and water logged. Most importantly, the retorted beans tend to have a lower nutritional value as a result of reduced protein quality. The flavor is further altered by having the lining of the can influence the flavor of the beans, as the epoxy lining on cans can influence the flavor of the beans. Additionally, canning can be undesirable because the beans cannot be viewed by the consumer and, typically, flavoring is added to the retorted beans which the consumer may not want.

A final known process uses salt and water to lower the water activity of the treated bean. This process does produce a bean that is natural looking and has extended storage capabilities; however, this process suffers from the disadvantage that large amounts of salt must be used. The use of salt is undesirable because of the negative health effects associated with adding too much salt to a person's diet. Not only does salt have negative health consequences, but if not enough salt is added, the water activity is not sufficiently lowered so that the potential for microbial growth readily exists. Thus, it is further desired to have a process that produces a bean that does not incorporate preservatives with harmful short term and long term side effects.

SUMMARY OF THE INVENTION

The present invention relates to reduced water activity legumes, with the most preferred legume produced according to the present method being a reduced water activity bean, and a method for producing the reduced water activity legumes. Reduced water activity is important because this means that the amount of water available for microbial growth and for germination or sprouting in the legume is greatly reduced. Essentially, the legume is preserved because of the low water activity. In addition to having reduced water activity, the legumes can be produced so that they are fully hydrated, meaning the legumes are hydrated to a level ranging between about 40% and about 65% total moisture. Alternatively, the reduced water activity legumes produced can be intermediate moisture legumes having a moisture level ranging between about 20% and about 39% total moisture. Whether the treated legumes are fully hydrated or intermediate moisture, the legumes will have reduced water activity and desirable characteristics discussed below.

The present method is particularly desirable because a treated legume, preferably a bean, is produced that has low water activity; can be stored for long periods of time; has a natural looking appearance, taste, and feel; can be fully or partially hydrated; and can be ready to use within 5 minutes. Additionally, the beans produced according to the present process have a full complement of starch and protein, meaning the beans have a nutritional value similar to a fresh untreated bean. The treated bean is suitable for human and animal consumption.

The present method used to produce reduced water activity legumes having a full complement of starch and protein, requires mixing hydrated legumes with a humectant or a humectant in solution. Preferably, a humectant solution is used. Additional steps can be added, but it is crucial to the present invention that the humectant solution be added to hydrated legumes. The present method is especially desirable because it can be completed in a single step involving adding a humectant solution to hydrated legumes. The legumes can then be packaged and ready for use even if some of the humectant solution has not diffused into the legumes, meaning the legumes can be packaged in a humectant solution. Alternatively, the legumes can be dried and packaged without the humectant solution. It is emphasized that it is contrary to the presently claimed method to hydrate the legumes simultaneously with the addition of the humectant solution. Generally, the steps of the present method can include hydrating a selected amount of legumes, intermixing a humectant solution with the hydrated legumes so that the humectant in the solution will diffuse into the hydrated legumes, and drying the legumes after the infusion of the humectant. The hydrated legumes are developed by adding water thereto or by picking fresh legumes out of the field.

The order in which the steps of the present method are performed is particularly important. If the humectant solution and water for hydration are combined in the same step, then it takes a greater amount of time at a higher temperature to hydrate the legumes. Additionally, pressure may be required to promote diffusion of the humectant into the legumes. Of greater importance than the time, is the fact that the legumes resulting from combining the hydration step with the humectant solution addition step are inferior to the legumes resulting from observing the order of the steps of the present method. As mentioned, the legumes produced according to the present method have a full complement of starch and protein, as well as, a desirable taste and appearance. If the humectant solution is added with the water in an attempt to hydrate the beans simultaneously with the exposure to the humectant solution, the resulting legume product will have an undesirable appearance and the sugars in the legume will have caramelized somewhat, thereby altering the taste and nutritional value of the treated legume. Also, the legume will not have a full complement of protein. Conversely, the present method produces legumes that have a natural looking appearance and a nutritional value similar to natural untreated legumes. Also, the flavor of the treated legumes is not altered. Most importantly, the sugars and proteins in the legumes of the present method have not significantly caramelized or been altered.

BRIEF DESCRIPTION OF THE DRAWING

FIG. 1 Graph showing effect of humectant solutions on the weight gain or loss of fully hydrated beans.

DETAILED DESCRIPTION

The present method relates to a process for producing a low water activity legume, which can be ready to use in a short period of time, has long lasting shelf stability, can be fully or partially hydrated, and in general has a full complement of starch and protein, and the legume produced by the present process. Most preferably, the present method is used to produce low water activity beans, including both intermediate moisture and fully hydrated beans. Because the resulting treated bean has a low water activity, this prevents the treated bean from spoiling due to microbial and/or fungal growth. Low water activity inhibits microbial and fungal growth because water that is necessary for growth and propagation of the various microorganisms is not made available to the microorganisms. Additionally, low water activity prevents sprouting of the bean.

The method of the present invention is initiated by selecting a legume which is suitable for human consumption. Potentially, any food stuff containing starch can be used with the present process; however, the selected legume is preferably a bean, but peas and other legumes may also be used. Because beans are the preferred legumes, beans will be referred to throughout the present application. Among the beans that may be used in the present method are chick peas, red beans, navy beans, pink beans, pinto beans, lentils, black eyed beans, fava beans, black beans, kidney beans, and a variety of other edible beans and combinations of beans.

Once the variety of the beans is selected, an amount of beans to be produced by the present process is determined. The amount of beans selected for use in the present process will depend on the desired final use. In other words, the amount of beans treated will be based on whether the present method is part of a home process or an industrial food production process. However, the amount of beans that can be treated according to the present process can range from a singular bean to millions of pounds of beans. Preferably, the present process is part of an industrial process whereby the amount of beans treated is determined by the size of the mixing vats used to hydrate the beans or mix the beans with a humectant solution. Because the present process can be continuous, the only limitation on the amount of beans treated according to the present process will be the speed and size of the equipment and the amount of beans and humectant solution readily available. The most preferred amount of beans treated in the present process will range between about 2000 pounds and about 10,000 pounds per batch. Among the processes that may be used with the present process are continuous, continuous-batch, and batch processes.

Once the beans are selected and fully hydrated, as a result of picking fresh beans or mixing the beans with an amount of water, they are mixed with an amount of humectant solution sufficient to lower the water activity of the beans to a range of between about 0.50 and about 1.00, to maintain a level of hydration in the beans greater than 40% total moisture in the beans, and to cause an amount of the humectants in the humectant solution to diffuse into the beans with the amount of humectants in the beans equal to from between about 0.1% by weight to about 15% by weight of the beans. More preferably the amount of humectants in the beans, as a result of using the present process, will range between about 5% and about 10% by weight of the beans. Preferably, after the addition of the humectant solution the level of hydration in the beans is between about 40% and about 60% total moisture in the beans and the water activity is equal to between about 0.75 and about 0.85.

The humectant solution will result in the binding of free water molecules in the hydrated beans by the humectant, thereby lowering the water activity in the beans. Use of the humectant solution results in the humectants present in the solution migrating into the beans without significantly lowering the percentage of water in the beans. When the most preferred humectant solution is used with hydrated beans the water in the hydrated beans does not migrate out of the beans into the humectant solution in such a manner as to cause an overall weight loss in the treated beans, as shown in FIG. 1. Theoretically, a one to one exchange will occur between the humectant molecules present in the humectant solution and the water molecules present in the hydrated beans. However, an exchange may occur where one part humectant is exchanged for three parts water. The exchange can occur at a variety of temperatures, including, but not limited to, room temperature which prevents the caramelization of the sugars in the beans and the occurrence of Maillard browning which alters the structure of the starches, carbohydrates, and proteins in the beans. By preventing caramelization and Maillard browning beans are produced that are very similar to untreated fresh beans.

As mentioned, the humectant solution can be mixed with the beans at room temperature; however, any temperature can be used that allows for the diffusion of the humectant into the beans and which does not result in the alteration of the starches, sugars, or proteins in the beans. Preferably, the temperature of the hydrated beans and humectant solution mixture will range between room temperature or about 25° C. and about 100° C., with the most preferred temperature being about 37.5° C. The temperature selected will be the optimal temperature for allowing diffusion of the humectants into the beans without the diffusion time being excessive by industry standards and without altering the structure of the beans.

The amount of humectant solution added to the hydrated beans must be sufficient to result in diffusion of the humectant into the beans and the lowering of the water activity in the beans, while maintaining the percentage of water in the beans between about 20% and about 65% total moisture in the beans. The amount of humectant solution added is dependent in part on the particular humectant in the solution. More preferably, the amount of water in the beans is between about 40% and about 60% total moisture in the beans. Preferably, the amount of humectant solution added to the beans will equal a ratio of 1 part by weight of hydrated beans to 3 parts by weight of humectant solution. A greater amount of humectant solution can be used, however, eventually it becomes cost prohibitive. An alternative embodiment is 1 part by weight of hydrated beans to 1 part by weight of humectant solution. Still another way to determine how much humectant solution should be added to the hydrated beans is to simply add from about 0.1 parts by volume to about 10 parts by volume of humectant solution to about 1 part by volume of beans. Preferably, the humectant solution is added in an amount equal to from about 1 part by volume to about 3 parts by volume of humectant solution to 1 part by volume of hydrated beans.

The humectant solution is mixed with the hydrated beans for a time period equal to from about 1 minute to about 12 hours dependent upon the amount of water present in the beans and the humectant solution. The time period will also be dependent in part upon the temperature of the humectant solution and the desired water activity in the beans. The more preferred time for mixing the hydrated beans and humectant solution is equal to between about 5 minutes and about 45 minutes, with the most preferred time period for mixing the hydrated beans and humectant solution equal to about 15 minutes. As shown in FIG. 1, it is important for the beans to maintain their weight prior to treatment or to gain weight as a result of the treatment. What the maintenance of weight or weight gain means is that the beans are not losing water as a result of the treatment. FIG. 1 shows that certain humectant solutions can initially cause the loss of water from the beans. The most preferred humectant solution will not cause a loss of water and the humectants will adequately diffuse into the bean within 15 minutes.

The humectant solution is formed by combining an amount of water and an amount of humectant to form the humectant solution. Any food grade humectant can be used in the humectant solution. Examples of food grade humectants include, but are not limited to, glycerol or glycerin(e), propylene glycol, polyglycols, polyols, sugar alcohols, and simple sugars including sucrose, fructose, glucose, galactose, and lactose, as well as mixtures thereof. The amount of water to humectant used in the humectant solution will vary according to the selected humectant to be used in the humectant solution. Certain humectants more readily attract water than other humectants, for example propylene glycol, which means a lesser amount of humectant will be needed in the humectant solution. If too much humectant is used it will pull too much water out of the hydrated beans, thereby preventing the formation of a fully hydrated low water activity bean. Also, the use of too much humectant may increase the length of time of treatment. Thus, the amount of humectant used in the humectant solution must be an amount sufficient to lower water activity while preventing the hydrated bean from becoming at least partially dehydrated. Typically, the humectant solution will be comprised of an amount of water equal to from about 0% to about 99% by weight of total humectant solution and an amount of humectant equal to from about 100% to about 1% by weight of the total humectant solution. More preferably, the humectant solution will be comprised of an amount of water equal to from about 30% to about 70% by weight of total humectant solution and an amount of humectant equal to from about 70% to about 30% by weight of the total humectant solution. Generally, if certain humectants are used the amount of humectant in the humectant solution will be equal to the percentage of moisture in the hydrated beans. A preferred example of a humectant solution contains an amount water equal to about 44% by weight of the total humectant solution and an amount of glycerine equal to about 56% by weight of the total humectant solution to be used with hydrated beans having a moisture level equal to or greater than 56% total moisture. The preferred humectant solution is added to an amount of hydrated beans for a time period equal to about 15 minutes. Dependent upon the amount of water in the beans and the type of humectant selected the composition of the humectant solution can be altered.

As mentioned, the beans need to be hydrated before treatment with the humectant solution. If the beans are not hydrated, then additional steps must be included in the present method. Additionally, some of the steps mentioned hereinafter can be used regardless of whether the bean is hydrated initially. If the beans are dehydrated initially, they are placed in a mixing vat and mixed with a selected amount of water. The amount of water added to the mixing vat will be dependent upon the amount of water necessary to adequately hydrate the beans within a desired amount of time. Any amount of water can be used that is sufficient to hydrate a selected amount of beans to an amount of about 40% to about 60% total moisture in the beans and preferably about 50% to about 55% total moisture in the beans. The amount of water added will be in part dependent upon the bean variety, as the amount of water absorbed by the bean variety will depend upon the amount of starch in the bean variety. A typical dehydrated bean contains from about 5% to about 8% total moisture and from about 95% to about 92% solid matter, a preferred hydrated bean will contain about 50% total moisture and about 50% solid matter, with the mass of the bean increasing as a function of the absorption of water. Typically, the beans are mixed with an amount of water equal to a ratio of about ⅓ by volume of beans to about ⅔ by volume of water. Thus, for example, approximately 2000 pounds of beans can be mixed with water in excess of about 1800 pounds of water to equal about 3800 pounds of hydrated beans. The mixing chamber may range in size from a pot capable of being used on a stove top to an industrial sized chamber capable of holding about 50,000 pounds of the bean and water mixture or more. Generally, the amount of beans treated with the present method will range between about 2000 pounds of beans per batch and about 50,000 pounds of beans per batch.

When the beans are placed in the mixing chamber the water added thereto will have a temperature ranging between room temperature or about 20° C. and about 100° C. The more preferred water temperature will equal about 100° C. Additionally, the mixing chamber may be jacketed so as to maintain the preferred water temperature range and may also have a mixing paddle or similar device that can be used to actively mix the bean and water mixture. Other means can be used besides a jacketed mixing chamber to maintain the water temperature. Mixing the bean and water mixture is desirable because this helps speed hydration of the beans; additionally, as the temperature of the water is raised so is the speed of hydration. Potable water or clean water is preferred because it will minimize the microbial load carried into the mixing process.

Typically, the beans take between 0 and eight (8) hours to hydrate in water temperatures ranging between about 20° C. and 100° C., which is hydration according to the standard methods in the industry. Preferably, the beans are placed in the water for between 0 and two (2) hours at 100° C. The beans will hydrate at a faster rate in water having a higher temperature, so that as the temperature of the water is raised the beans will hydrate faster. Regardless of the time and temperature, the beans must be fully hydrated meaning the moisture level in the beans should be from about 40% to about 60% of the total moisture percentage in the beans. The preferred moisture level will be equal to about 50% of the total moisture percentage in the beans.

After the beans have been hydrated, the excess water remaining in contact with the beans is removed from the mixing chamber. In place of the water the humectant solution is added to the mixing chamber. Instead of draining the excess water, an alternative method can be used wherein the humectant solution is formed in the tank using the excess water.

An alternative to determining the amount of humectant solution added to the beans is to add the humectant solution in an amount equal to from about 0.1% to about 100% by volume of the total water added in the hydration step of the present method. The humectant solution is added in amount equal to from about 60% to about 100% by volume of the total volume of water used to hydrate the beans, with the most preferred amount of humectant used equal to about 100% by volume of the total volume of water. Regardless of how the humectant solution is added, enough of the humectant solution must be added to lower the water activity in the beans to between about 0.50 and about 1.00.

An additional element that can be added is salt, preferably sodium chloride. The salt can be added in the hydration step or with the humectant solution. The amount of salt added is equal to between about 0.1% and about 10% of the total amount of water in the hydrated beans, with the salt enhancing the preservation characteristics of the treated beans.

Another constituent, an acidulant or a like composition can be added to the hydrated beans prior to, simultaneous with, or after the exposure of the beans to the humectant solution. Any acidulant can be used, however, the preferred acid is a food grade acidulant, such as food grade acetic acid or phosphoric acid. The acetic acid can be added in amount equal to from about 0.01% to about 50% by volume of the total solution in the mixing chamber, which is either the total water or humectant solution present in the mixing chamber. The preferred amount of acetic acid added is equal to about 10% or less by volume of the total water or humectant solution present in the mixing chamber. The addition of the acetic acid is desirable because it speeds or enhances the hydration of the beans, kills the bean embryo, and enhances the preservation characteristics in the treated bean. Killing the bean embryo is desirable because this will eliminate any chance of sprouting of the bean after it has been packaged, as water can enter the packaging. The acetic acid helps to preserve the treated beans by preventing the growth of microorganisms, such as bacteria and fungus or molds, which could be present in the beans or the water used to hydrate the beans. The acetic acid lowers the pH of the bean and water or bean and humectant solution thereby killing the microorganisms. Among the food grade acidulants that may be used are food grade acetic acid, phosphoric acid, food grade hydrochloric acid, citric acid, malic acid, lactic acid, ascorbic acid, erythorbic acid, and combinations thereof. Also, phosphates can be used as an acidulant. Whichever acid is selected it is preferred to select enough of the acid to lower the pH in the beans to below 4.5. While a pH below 4.5 is most preferred, the acid can be added in amounts sufficient to lower the pH in the beans to from about 6.0 to about 2.0. Acetic acid is most preferred because it volatizes easily when the treated beans are prepared at home or in retail channels. Also, the acetic acid can speed the hydration of the beans by opening microscopic pores or channels in the bean. It should be pointed out that the coupling of lowering water activity and treating the beans with acid will protect against microorganisms and thus result in greater preservation characteristics in the beans.

After the beans have been sufficiently exposed to the humectant solution so as to lower the water activity in the beans, the beans are removed from the mixing chamber and the excess moisture may be optionally removed from the beans. Removal of the excess moisture from the surface of the beans may be accomplished by drying the beans in any device capable of removing excess water from the beans without scorching the skin of the beans. The beans can be dried at a temperature ranging between about 32° C. and any temperature below scorching the bean skin. The time period for drying the beans will be equal to a time period ranging between about 0 to about 3 hours. Among the devices that may be used to dry the beans are a drum dryer, flash dryer, tunnel dryer, flat bed dryer, and a fluid bed dryer. Regardless of the parameters chosen the beans must be dried in such a manner so as to preferably lower the moisture level in the beans to from about 55% to about 20% of the total moisture in the beans. The reduced moisture beans are then ready to be commercially packaged or placed into a food stuff for human consumption.

An alternative step to drying the beans involves packing the beans in a humectant solution. Enough of the humectant solution can be added so as to cover all of the beans in the packaging. The humectant solution used to package the beans should have a similar ratio of water to humectant, as the humectant solution used to treat the beans so as to maintain the water humectant equilibrium in the beans.

The beans treated according to the present process are desirable because they will have a natural looking appearance, low water activity which will prevent spoilage, and allow for a ready to use bean within 5 to 10 minutes of placement into boiling water. While boiling water is the preferred way to make the low water activity bean ready to use, the bean can be made ready to use by placing the bean in an aqueous solution having a temperature of at least 15° C. for at least five (5) minutes. The beans treated according to the present invention are especially desirable when compared to dehydrated beans which typically require overnight soaking followed by boiling the beans in order for the beans to be ready for use.

EXAMPLES

Example 1

Reduced water activity fully hydrated red beans were produced by mixing 453 grams of dehydrated red beans containing approximately 6% moisture by weight of the total beans or 28 grams of water with enough water to cover the beans with an excess amount of water, such that the beans were covered with 2 inches of tap water. The beans were soaked in the tap water for approximately eight hours in a standard three quart stainless steel pot. At the end of eight hours the water that had not migrated into the beans was separated from the beans which had become fully hydrated. The hydrated beans weighed 923 grams, meaning they absorbed approximately 470 grams of water. The hydrated beans contained a total moisture content of approximately 53.95% total moisture by weight of the beans and an amount of solids equal to 47.05% solids by weight of the beans.

After the hydrated beans were prepared, a humectant solution was prepared. The humectant solution contained 200 grams of water and 250 grams of glycerin USP 96% manufactured by The Dow Chemical Company, Midland, Mich. Thus, the humectant solution was comprised of an amount of water equal to approximately 44% by weight of the total humectant solution and an amount of glycerin or humectant equal to about 56% by weight of the total humectant solution.

150 grams of hydrated beans were then mixed with 450 grams of the humectant solution in a stainless steel pot. The beans were mixed with the humectant solution at room temperature for 15 minutes. At the completion of 15 minutes the beans weighed 159.4 grams and there was approximately 438 grams of humectant solution remaining in the stainless steel pot. This means that the hydrated beans absorbed approximately 9.4 grams of humectant solution.

The finished beans had a natural color and texture and a water activity of approximately 0.85. Some of the beans (approximately 50 grams) were then heated in water for ten minutes after completion of the process and were table ready at the completion of the ten minute time period. Also, some of the beans, the remainder, were stored in a refrigerator at 4° C. for 60 days, so that after the passage of the 60 days the beans were not spoiled and had not sprouted.

Example 2

150 grams of the hydrated red beans of Example 1 were mixed with 450 grams of the humectant solution produced according to the method recited in Example 1. The hydrated beans and humectant solution were mixed together for approximately 30 minutes. The finished beans had essentially the same characteristics as the beans disclosed in Example 1.

Example 3

150 grams of the hydrated beans of Example 1 were mixed with 450 grams of the humectant solution produced according to the method recited in Example 1. The hydrated beans and humectant solution were mixed together for approximately five (5) minutes. At the completion of five minutes the beans weighed 145.2 grams and the humectant solution weighed 454 grams. This means that the humectant solution actually caused water to diffuse out of the hydrated beans and reduced the level of hydration in the beans. This shows that before the humectants diffused into the beans some of the water diffused out of the beans. Thus, sufficient exposure time must occur for the beans to have the humectant adequately diffuse into the beans.

Thus, there has been shown and described a novel method for producing reduced water activity legumes which fulfills all of the objects and advantages sought therefor. It will be apparent to those skilled in the art, however, that many changes, variations, modifications, and other uses and application for the subject method are possible, and also changes, variations, modifications, and other uses and applications which do not depart from the spirit and scope of the invention are deemed to be covered by the invention which is limited only by the claims which follow.

What is claimed is:

1. A method for producing reduced water activity, fully hydrated legumes, said method consisting of:
   (a) selecting an amount of legumes which are hydrated, with the legumes having a hydration level ranging between about 40% and about 65% total moisture in the legumes;
   (b) preparing a humectant solution by mixing an amount of water with an amount of a humectant, with said humectant solution comprised of an amount of said humectant equal to from about 30% to about 70% by weight of said humectant solution and an amount of water equal to from about 30% to about 70% by weight of said humectant solution;
   (c) adding an amount of said humectant solution to the hydrated legumes and allowing the legumes and said humectant solution to remain in contact for a period of time equal to at least about 5 minutes so as to produce said reduced water activity legumes which have a water activity ranging between about 0.50 and about 1.00 and an amount of said humectant present in said reduced water activity legumes ranging between about 0.1% and about 15% by weight of said reduced water activity legumes; and,
   (d) adding an amount of food grade acidulant equal to from about 0.01% to about 50% by volume of said humectant solution.

2. The method of claim 1 wherein said humectant more preferably is present in said reduced water activity legumes in an amount ranging between about 5% and about 10% by weight of said reduced water activity legumes.

3. The method of claim 1 wherein the water activity in said reduced water activity legumes more preferably ranges between about 0.75 to about 0.85.

4. The method of claim 1 wherein the legumes are selected from the group consisting of beans and peas.

5. The method of claim 1 wherein said humectant is selected from the group consisting of glycerin, propylene glycol, polyglycols, polyols, sugar alcohols, simple sugars, and combinations thereof.

6. The method of claim 1 wherein said food grade acidulant is selected from the group consisting of food grade acetic acid, phosphoric acid, food grade hydrochloric acid, citric acid, malic acid, lactic acid, ascorbic acid, erythorbic acid, and combinations thereof.

7. The method of claim 1 wherein said method includes adding an amount of salt equal to from about 0.1% to about 10% of the total amount of water found in said reduced water activity legumes.

8. The method of claim 1 wherein said method includes placing said reduced water activity legumes in an amount of an aqueous solution having a temperature of at least 15° C. for at least 5 minutes to produce a legume having an amount of protein ranging between about 5% and about 20% by weight of said legume, an amount of protein ranging between about 5% and about 20% by weight of said legume, an amount of carbohydrates equal to between about 10% and about 25% by weight of said legume.

9. A method for producing reduced water activity fully hydrated beans said method consisting of:
   (a) selecting an amount of beans which are hydrated, with the beans having a hydration level ranging between about 40% and about 65% total moisture in the beans;
   (b) preparing a humectant solution by mixing an amount of water with an amount of a humectant, with said humectant solution comprised of an amount of humectant equal to from about 30% to about 70% by weight of said humectant solution and an amount of water equal to from about 30% to about 70% by weight of said humectant solution;
   (c) adding said humectant solution to the hydrated beans and allowing the beans and said humectant solution to remain in contact for a period of time sufficient to produce hydrated reduced water activity beans which have a water activity ranging between about 0.50 and about 1.00 and an amount of said humectant present in said reduced water activity beans ranging between about 0.1% and about 15% by weight of said reduced water activity beans; and
   (d) adding an amount of food grade acidulant equal to from about 0.01% to about 50% by volume of said humectant solution.

* * * * *